(12) United States Patent
Steiner et al.

(10) Patent No.: US 7,910,044 B2
(45) Date of Patent: Mar. 22, 2011

(54) METHOD AND DEVICE FOR PRODUCING PROFILED, AT LEAST SECTIONALLY ELONGATED ELEMENTS

(75) Inventors: Gottfried Steiner, Spielberg (AT); Thomas Krivec, Zeltweg (AT)

(73) Assignee: DIPL. ING. Gottfried Steiner (AT)

( * ) Notice: Subject to any disclaimer, the term of this patent is extended or adjusted under 35 U.S.C. 154(b) by 458 days.

(21) Appl. No.: 11/577,668

(22) PCT Filed: Oct. 18, 2005

(86) PCT No.: PCT/EP2005/055343
§ 371 (c)(1),
(2), (4) Date: Jan. 7, 2008

(87) PCT Pub. No.: WO2006/045720
PCT Pub. Date: May 4, 2006

(65) Prior Publication Data
US 2008/0251963 A1     Oct. 16, 2008

(30) Foreign Application Priority Data
Oct. 21, 2004    (AT) .................................. 1774/2004

(51) Int. Cl.
B29C 45/04       (2006.01)
(52) U.S. Cl. ...................... 264/328.7; 425/457; 425/577

(58) Field of Classification Search ............... 264/328.7, 264/328.11; 425/150, 577, 457
See application file for complete search history.

(56) References Cited

U.S. PATENT DOCUMENTS
2,443,053 A * 6/1948 Parmelee ...................... 264/296
* cited by examiner

*Primary Examiner* — Christina Johnson
*Assistant Examiner* — Galen Hauth
(74) *Attorney, Agent, or Firm* — Ostrolenk Faber LLP

(57) ABSTRACT

A method and an injection mold for the production of profiled and at least partially elongated components out of liquid or viscous solidifying molding compounds, by said injection mold, the molding compound being injected into the mold cavity and transported away under steady extension of the mold cavity and under steady elongation of the component to be formed after the initial filling of the mold cavity. The molding compound transported away is transported out of the mold while molding compound is continuously being injected until the forming component reaches its final length. The mold has at least one mold insert whose surface is part of the peripheral surface of the mold cavity and which is supported in the mold in a movable way in longitudinal direction of the component to be formed so that the mold cavity forming the component can be expanded to the desired size and shape of the component inside and outside of the mold by a movement of the mold insert. Thus the invention makes it possible to produce components that have complex contours, are elongated, at least partially, and have a finite size in a high quality at a low expenditure.

23 Claims, 15 Drawing Sheets

METHOD AND DEVICE FOR PRODUCING PROFILED, AT LEAST SECTIONALLY ELONGATED ELEMENTS

The invention relates to a method for the production of components that are profiled, at least partially elongated components out of liquid or viscous solidifying molding compounds by means of an injection mold, wherein the molding compound is injected into the mold cavity and transported away under steady extension of the mold cavity and under steady elongation of the component to be formed after the initial filling of the mold cavity.

Furthermore, the invention relates to an injection mold for the production of components that are profiled and at least partially elongated out of liquid or viscous solidifying molding compounds, wherein the injection mold comprises two closeable and openable parts of the mold, each consisting of several mold components forming the mold cavity that can be filled by the molding compound by at least one gate.

It is known and common to produce elongated components out of liquid or viscous molding compounds that solidify due to curing or due to freezing in an injection molding or an extrusion process. Injection molding processes are suitable for the production of profiled and three-dimensional components with a relatively complicated shape. The extrusion process makes it possible to manufacture components whose geometries correspond to the section of the applied extrusion die. Components made in an extrusion process are often used as semi-finished products or starting products for products, which are turned into a final product by forming or joining processes like cutting the extruded profile into predefined lengths, by attaching end caps or similar components to the profile in a welding process.

Methods and devices as described above are known from JP 7-112457, from JP 5-278082 and from DE 196 22 093 A. In these cases, a mold cavity with a defined length is filled up with a molding compound in such a way that the injected compound is transported away from the gate by a cavity insert under continuous filling of the cavity.

From EP 0 345 202 B1, a method for injection molding of a elongated part especially a tire tread, is known. There a defined segment of the tire tread is molded in the cavity of a mold. The mold is characterized by an open end, which is enclosed by the towing end of a solidified section. A closed end of the cavity moderating the temperature prevents the total solidification of the towing area of the molded section while the rest of the section of the molded component completely sets. After setting of the molded section, the form can be opened, and the molded section can be transferred to a position outside the mold cavity. The towing end of the molded section, which is not completely solidified, is clamped at the open end of the injection mold in order to act as a barrier while the next section of the tire tread is being molded. During the molding cycle for the next section of the tire tread the towing end of the tire tread formed in the previous process step is totally set and connected to the newly formed section. This process can be repeated without restriction so that a tire tread with pre-defined length can be produced for storage or shipping.

The U.S. Pat. No. 3,992,503 illustrates a method for the production of ribbed tube out of thermoplastic material. There a section of a tube is produced in an injection molding process in a mold cavity formed by two halves of a so that the desired ribbing is formed on the outer surface of the tube. After solidification of the tube section, the outer part of the mold is removed and the set tube section is shifted in longitudinal direction. Then the outer part of the mold is re-positioned such that a mold cavity for molding the next section of the tube is formed in a closed position. The process steps are repeated until the tube reaches the desired length. A further similar process for the production of tubular components in sections, which is based on a similar method, is known from EP 0 018 044 A1.

The production of elongated components in sections in accordance with the known state of the art requires complicated mechanisms for opening and closing the parts of the mold during the manufacturing process and devices for the stepwise transport of the product to be manufactured. This causes a high workload and expenditure of time. Due to the discontinuous process, the manufactured components are inhomogeneous, and the quality of said components does not correspond to today's requirements placed on highly demanding applications.

Therefore, the primary task of the present invention is to provide an injection mold and an injection molding process which do not have the described disadvantages and which make it possible to produce components that have complex contours, are elongated, at least partially, and have a finite size in a high quality at a low expenditure.

As far as the method is concerned, these and other objects of the present invention are attained in such a way that the solidified compound transported away is transported out of the mold while molding compound is injected until the component to be formed has finally reached its final length.

As far as the injection mold is concerned, these and others of the present invention are attained in such a way that a mold insert of the mold, which partially forms the initial mold cavity, is movable in the direction of the axis of the profiled component to be formed such that the cavity of the mold, forming the component is extensible inside and outside of the mold to the desired length of the component thanks to the movement of the mold insert.

In contrast to the conventional injection molding process, it is characteristic and essential for both the method and the mold that after the volumetric filling of the initial mold cavity, the forming injection molding continuously grows directly at the gate area and not at the melt front as this is the case in standard injection molding processes.

During the injection process, the molding compound already injected and slowly solidifying, which forms the profiled component is steadily transported away from the gating area. Thus the volume of the cavity is constantly increased, which enables the formed component to be enlarged by filling molding compound at the gating area. This way the component to be formed continuously grows to its final length and shape while the flow length the molding compound has to travel stays constant, at least basically. The method according to the invention differs from the common extrusion process in that it is possible to produce components of a pre-defined length whose geometry is not restricted as much as the geometry of extruded components. The invention allows to vary the length of the formed profiled components from one injection process to the other without modifying or altering the mold. Thus it is possible to produce profiled parts of different lengths in low numbers of pieces economically.

The enlargement of the formed profiled component under expansion of the initial mold cavity is attained easily by a movable mold insert that leaves the mold together with the shaped and solidified molding compound transporting the injected molding compound away from the gating area.

At one of the possible types of design of the method, the initial mold cavity is formed by at least one stationary mold insert and the movable mold insert. This simple type of design already makes it possible to produce several differently shaped components in accordance with the geometrical design of the two mold inserts.

At another possible embodiment, of the invention the movable mold insert is moved in one single linear direction so that it is easily possible to produce elongated components of a defined length.

If the movable mold insert is moved along a bent path and/or a path with corners, continuously bent profiles or profiles with angular transition areas, such as picture frames and components with a sheet like shape, can be produced.

At a particularly advantageous embodiment of the invention, a hollow section can be formed within the component by a core that is movable relatively to the stationary mold insert. If there is a corresponding number of mold cores, it is even possible to form more than one hollow sections in the component.

The mold core can already be part of the initial mold cavity, which allows additional possibilities for the geometrical design of the component to be formed.

After the initial mold cavity has been filled, the movement of the movable mold insert and/or of the mold core can be influenced and/or triggered by the pressure of the injected molding compound. This advantageous measure can be ensured by an appropriate setting of the process parameters.

It is advantageous for the formation of hollow sections in elongated components if the mold core is moved synchronously and according to the movement of the movable mold insert.

The movable mold insert as well as the mold core can be driven and controlled particularly appropriately and reliably by linear motors.

The method based on the invention enables sections of the formed component already solidified to move out of the mold together with and supported by the movable mold insert while the component is being detached from the stationary mold insert and from the mold core, if available. Thus it is possible to make essential parts of the mold more compact than at a conventional injection molding designed for the production of relatively long components.

The simplicity of the method in accordance with the invention is illustrated by further process steps. After the formation of the component in its desired length, the mold insert is stopped. The mold core is reset to its initial position after complete solidification of the component. After the mold core has been withdrawn, the void—formed by the core can be filled up with a medium, such as a polymeric foam. After the ejection of the component, the movable mold insert also is reset to its initial position.

If at least two gating areas are available, different molding compounds can be filled into the mold cavity, the initial mold cavity being filled through one of these gates and the opening(s) connected with the further gates being opened gradually by the movable mold insert during the expansion of the mold cavity. Thus the described method allows the application of one or more additional components onto components already injected. This increases the number of possible designs for the components that can be manufactured by using the method based on the invention.

The injection mold in accordance with the invention makes it possible to manufacture differently shaped, elongated components with or without voids, depressions or similar features.

The injection mold based on the invention has the following advantageous design features: The movable mold insert is positioned at one of the two parts of the mold in a movable manner; there is a stationary mold insert at the other part of the mold, which forms the initial mold cavity and the expanding mold cavity together with said movable mold insert and a possible mold core, which is positioned in a movable manner at said stationary mold insert and possibly with a mold core movable at the stationary mold insert.

In order to produce components which are elongated in one direction, it is merely necessary to position the movable mold insert on one of the two parts of the mold in one single direction.

In order to produce profiles that are continually bent or profiles with angular transition areas, such as picture frames and sheet like shaped components, the movable mold insert at one of the two parts of the mold only needs to be positioned in a movable manner movable in two orthogonal directions.

If the mold comprises a mold core for the formation of a void in the component, the mold core can be supported easily at the stationary mold insert so that the mold core is movable in the direction of the main extension of the component. In order to form a void in the component, the mold core can project into the mold cavity or can be insertable into the mold cavity. The movable arrangement of the mold core at the stationary mold insert can easily be achieved by means of an opening or bore through the stationary mold insert or a similar design feature.

The movable mold insert can be mounted in such a manner that it is movable on guide rails, which are attached to a stationary mold plate. For all components supported in a movable manner, appropriate sliding elements are used. These elements additionally ensure the required mutual sealing.

In order to mold elongated tubular components, it is intended that the movable insert as well as the mold core are movable in a linear and preferable synchronous way. The mold in accordance with the invention makes it possible to easily integrate inserts, such as threaded components, directly when producing the component. For this purpose, the mold can be designed in such a way that the inserts can be plugged or laid into the mold cavity or that inserts can be positioned at corresponding reception points at the movable mold insert.

The invention also excels by making it possible to produce components that are three-dimensionally structured, at least in sub-areas. This is, for example, achieved by introducing the appropriate three-dimensional structure at surface areas of the mold cavity, at which there is no relative movement in relation to the molding compound during the molding process.

Furthermore, the invention relates to components that are produced in accordance with at least one of the claims of the present invention and, in particular, components produced of thermoplastic molding compounds which are reinforced with long fibers, especially long glass fibers, at least partially. In comparison to the state of the art at injection molding, the short flow distances and the low number of gates per mold cavity result in a lower mechanical load acting on the molding compound so that the long fibers are kept in a good state.

Additional design features, advantages and details of the invention will now be described, by the way of example, by reference to the accompanying drawing wherein FIG. 1 is a longitudinal cross sectional view of a possible design of an injection mold in accordance with the present invention, FIG. 2 is a cross sectional view taken about on line A-A of FIG. 1, FIG. 3 to FIG. 5 are longitudinal cross sectional views analogous to that shown in FIG. 1 at different stages of the injection process, FIG. 6 is a longitudinal cross sectional view of the injection mold analogous to FIG. 1 after termination of the injection— and forming process, respectively, FIG. 7 is a longitudinal cross sectional view of an additional embodiment of an injection mold in accordance with the present invention at the initial stage of the injection process, FIG. 7a is a view of the component manufactured in an injection mold according to FIG. 7, FIG. 8 is a longitudinal cross sectional view of the injection mold according to FIG. 7 at a stage before termination of the injection process, FIG. 9 is a cross sectional view taken about on line B-B of FIG. 8, FIG. 10 is a longitudinal cross sectional view of the injection mold according to FIG. 7 to FIG. 9 at a stage at the termination of the injection process, FIG. 11 is a longitudinal cross sectional view of an additional design of an injection mold in accordance with the present invention at the initial stage of the injection process.

FIG. 1 to FIG. 6 show an embodiment of the invention which is subsequently described in detail. An injection mold usually consists of two part of the mold or mold halves, which are moved away from each other in order to open the mold. As is particularly shown in FIG. 1, FIG. 2 and FIG. 6, the first (upper) part of the mold comprises a stationary mold insert 9, which is permanently mounted at the upper mounting plate 4a, a mold core mounted so that is movable on said stationary mold insert, a sprue bush 7, which goes through the mold insert 9, and the upper mounting plate 4a and upper centering ring mounted to the upper mounting plate 4a.

Figure 2:
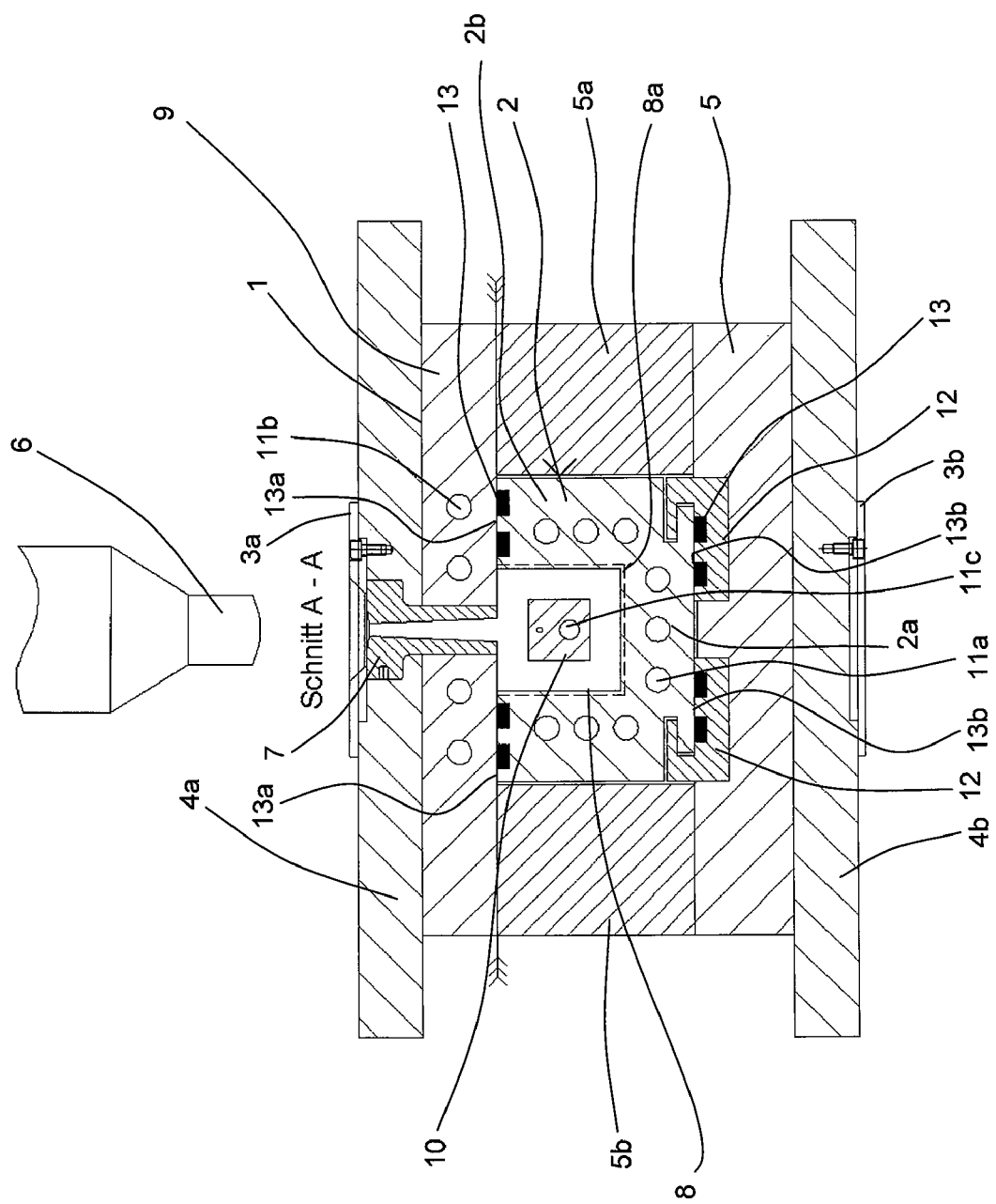

The second (lower) part of the mold comprises a lower mounting plate 4b with a lower centering ring 3b fixed on this plate, a mold plate 5, which is attached to said mounting plate 4b, support rails 5a and 5b, which can be seen in FIG. 2, and a mold insert 2, which is mounted so that is movable at the mold plate 5.

Further typical mold components, such as guide pillars, ejector elements, sensors, air intakes or venting elements and similar various mold components, that can be carried out according to the state of the art, are not shown.

Figure 1:
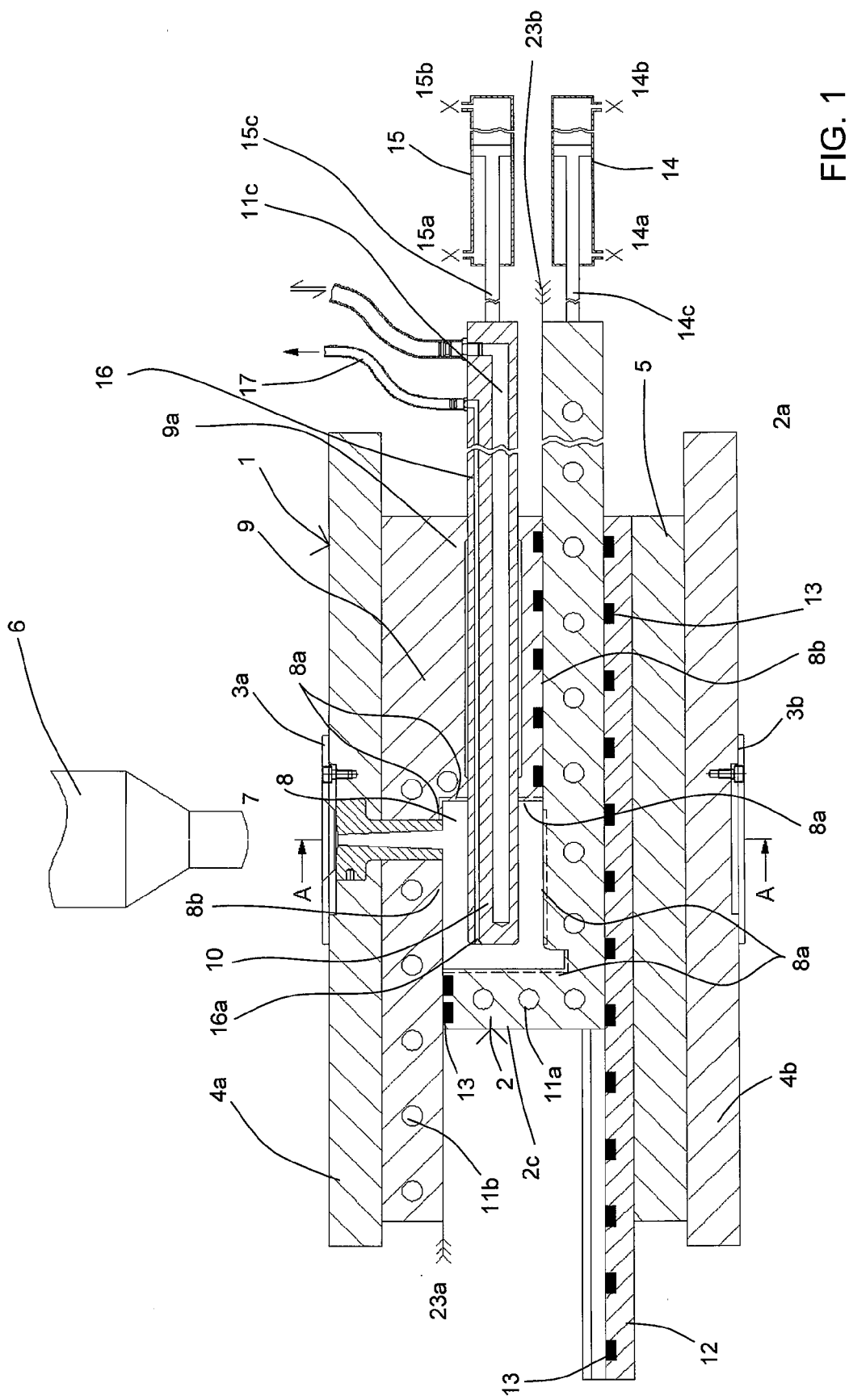

As FIG. 1 and FIG. 2 show, the mold insert 9 is sheet-like component equipped with a functional mold element 9a, which is equipped with a rectangular opening in longitudinal direction in order to support the mold core 10. The functional mold element 9a rests on the inner base side 2a of the U-shaped mold insert 2, whose lateral sides 2b, which are shown in FIG. 2, are in contact with the mold insert 9. The mold cavity 8 is formed between a section of the mold core 10, which exceeds the mold element 9a, specific areas of the mold insert 9, the sides 2a, 2b of the mold insert 2 and a front wall 2c of that mold insert.

The molding compound plasticated in the injection unit 6 is injected into the mold cavity 8 through a sprue bush 7. Via the cooling channels 11a, 11b, 11c, the mold inserts 2,9 and the mold core 10 can appropriately be temperature controlled in order to influence the solidification of the injected molding compound. In areas 8a, which have no relative movement with respect to the formed component as will be described later, the surfaces of the mold cavity can have a three-dimensional structure. Surfaces of the mold cavity 8b, where relative movement occurs, only can have structures which run in the direction of the movement of the movable mold insert. The situation at the surface of the mold core 10 is analogous to the situation at the mold cavity surface. Furthermore, said stationary mold insert 9 is designed so that at its contact areas to the mold insert 2, there is a coverage preventing the plasticated molding compound from penetrating between the movable and the stationary components of the mold during the injection process especially at the regions of the walls of the cavity 8 which are in the flow shadow.

The movable mold insert 2 is, as shown exemplarily in FIG. 1 and FIG. 2, guided in a way that it is movable in longitudinal direction in two guide rails 12. As mentioned above, the mold core 10, is guided in the stationary mold insert 9. A number of sliding elements 13, which are inserted in the mold insert 2, the mold insert 9 and the guide rails 12 facilitate the sliding and the relative movement to be described between the movable mold insert 2 and the mold insert 9 and the movable mold insert 2 and the guide rails 12.

The support rails 5a, 5b ensure a defined force at the contact area 13a between the movable mold insert 2 and the stationary mold insert 9 as well as at the contact areas 13b between the guide rails 12 and the movable mold insert 2 (refer to FIG. 2) depending on the effective clamping force. Like this excess friction due to the effective clamping at the contact areas 13a, 13b, that might cause a blocking of the movable mold insert 2, is avoided. A pressure sensor installed in the support rails enables a direct closed loop control of the clamping force in order to ensure that a clamping force that is optimal for the process is applied with regard to the effective cavity pressure.

The movable mold insert 2 is actuated by a linear drive 14, which can be operated manually, electrically, mechanically, pneumatically or hydraulically as this is shown. The linear drive 14 can be integrated into a mold component and directly controlled by units not shown. The movement of the movable mold insert 2 can also be influenced or triggered by the cavity pressure effective in the mold cavity 8. A second linear drive 15, which can be designed in analogy to the drive 14, is designated for the movement of the mold core 10. The two plunger cylinders of the linear drives 14, 15, shown in FIG. 1, can be directly controlled by the valves 14a, 14b and 15a, 15b. The mold insert 2 and the mold core 10 respectively are connected to the drives by the piston rods.

In longitudinal direction, the core 10, which is designed as an elongated component with a rectangular cross section, is equipped with a bore that leads to a gas valve 16a and is situated at the front of the core 10 inside the cavity. At the other end of the bore 16, compressed air or a different gas or fluids can be blown into the mold cavity through a hose 17. It can also be intended to evacuate the mold cavity 8 over the bore 16 and an appropriate valve.

FIG. 1 and FIG. 2 show the initial state with the mold already closed. The mold cavity 8 can be filled with air, flushed with inert gas or evacuated. Through the mounting plates 4a, 4b, the clamping force is applied onto the mold.

Figure 3:
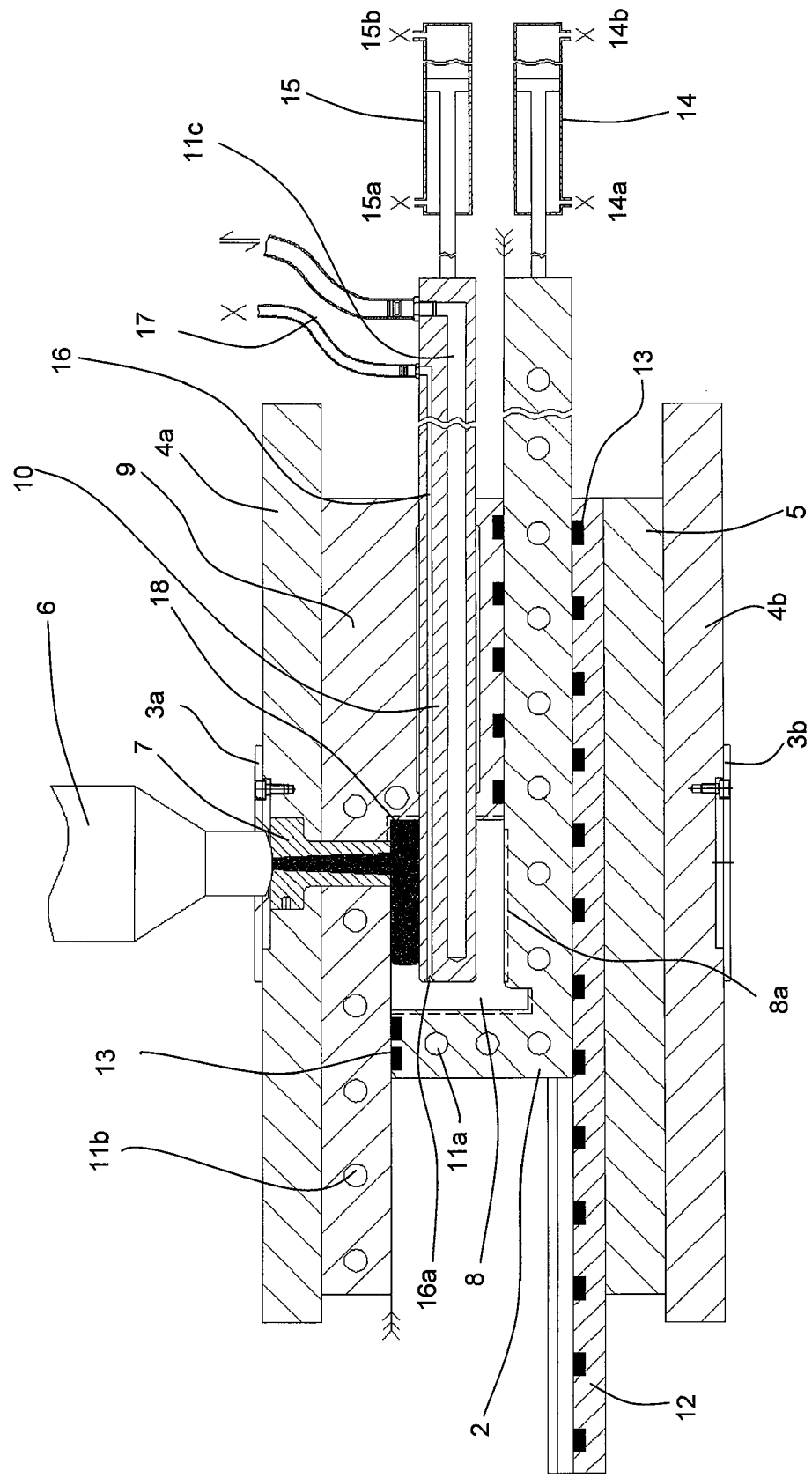

FIG. 3 shows the first stage of the injection process. The injection unit 6 lies at the sprue bush 7, and plasticated molding compound 18 has already been injected into the mold cavity 8. The valves 14a, 14b as well as 15a and 15b of the the linear drives 14, 15 as well as the gas valve 16a are closed.

As soon as the initial volume of the mold cavity 8 has been filled up with the molding compound 18, the cavity pressure in the mold cavity 8 rises. This causes a corresponding movement of the mold insert 2 and the mold core 10 against the resistance of the linear drives 14, 15 and against the frictional losses depending on the effective clamping force. A desired and controlled movement of the movable mold insert 2 and of the mold core 10 relative to the stationary mold insert 9, especially along the sliding surfaces 9a and 9b (see FIG. 4), is ensured by an appropriate control or feedback control of the effective cavity pressure condition in the mold cavity 8 by means of the injection unit 6 as well as by an appropriate control of the linear drives 14, 15. The arrows at the valves 14a, 14b and 15a, 15b of the linear drives 14, 15 illustrate the media flow for the control of the linear drives.

Figure 4:
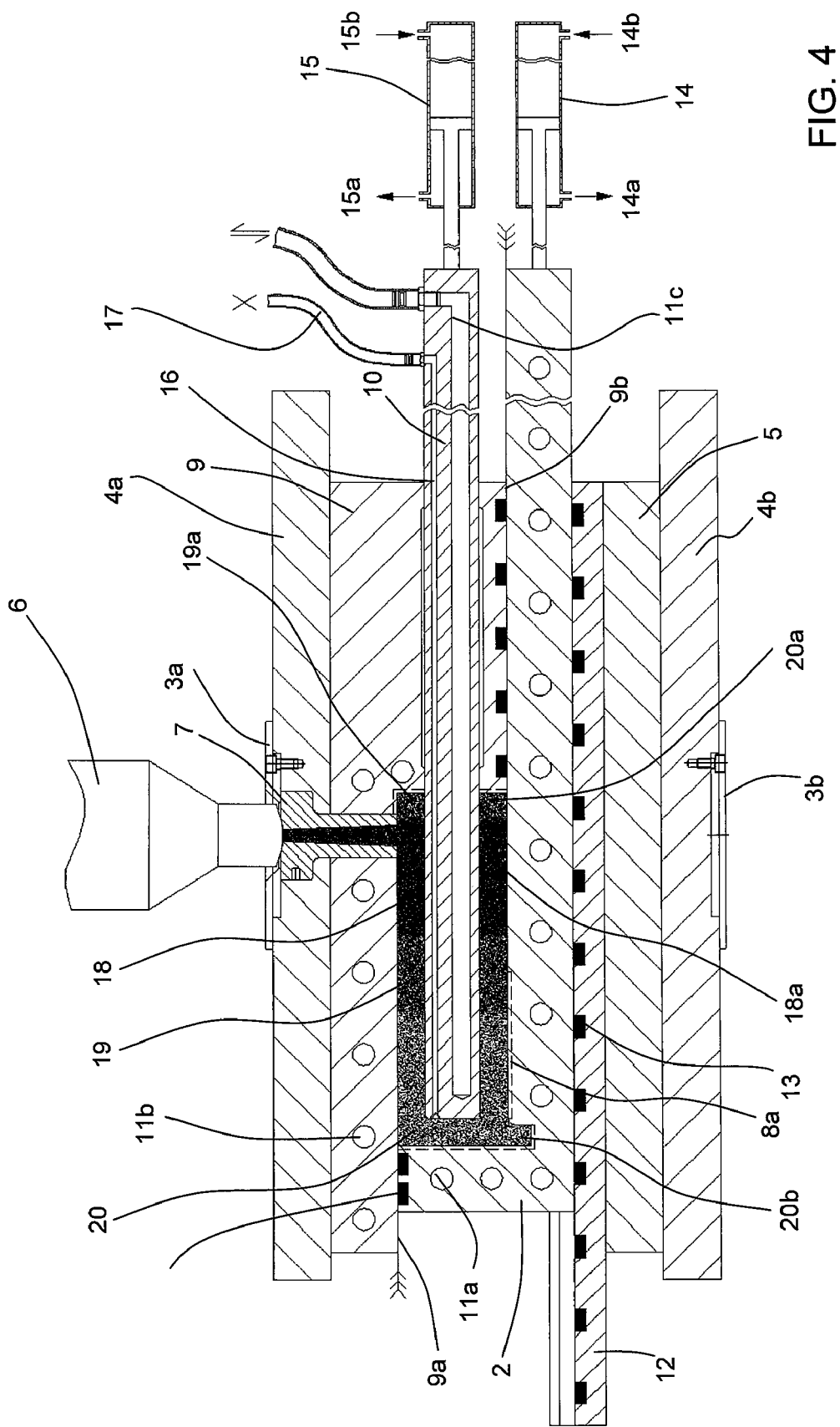

The injected molding compound, which can, for example, be a thermoplastic melt, solidifies gradually starting from its melted state, which is illustrated by the reference numbers 18 and 19 in FIG. 4 depending on pressure, temperature and time over the distance covered by the expanding mold cavity 8 as well as in the flow shadow 19a, 20a of the mold cavity 8. The reference numbers 19 and 20 identify areas of the injected compound at different cooling phases and stages of solidification. At the sliding face 9a of the mold insert 9, there is a relative movement between the injected molding compound 18, 19, 20 and the mold insert 9, which is comparable to the forming process at an extrusion die. At the movable mold insert 2, there is no relative movement with regard to the injected compound, which allows the formation of three-dimensional geometry elements 20b and structured surfaces 8a. At the sprue bush 7 and at the area around the mold core, additional plasticated material is delivered, especially at the region 18a, and new surfaces are continuously formed in flow direction. At the same time the elongation of the forming component takes place.

Figure 5:
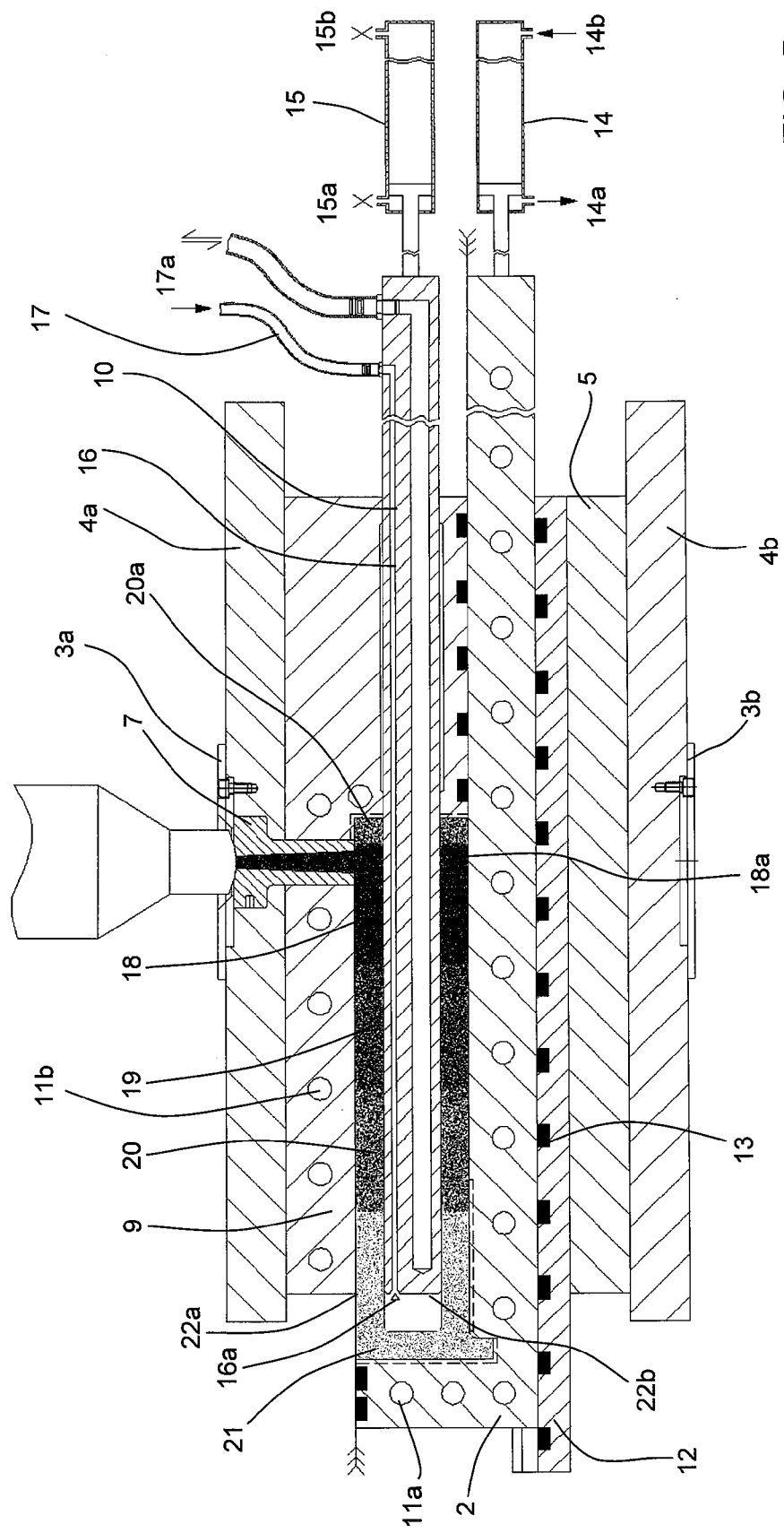

According to FIG. 5, the injected molding compound is already totally solidified at area 21 so that, this part of the injection molding can emerge from the mold as is also shown in FIG. 21. At area 21 the injection molding detaches from both, the stationary mold insert as well as from the mold core 10. The linear drive 15 of the mold core 10 is stopped by closing the valves 15a, 15b. The gas valve 16 is opened in order to fill up the developing void with a gas, such as air, inert gas or process gas, or with a fluid like water or oil. The pressure of the medium flowing into the void can be chosen in such a way that the molding compound that has not totally solidified yet is pressed against the insert 2 and 9 in the area of the developing void. Thus the profiled injection molding is calibrated by the internal pressure.

Figure 6:
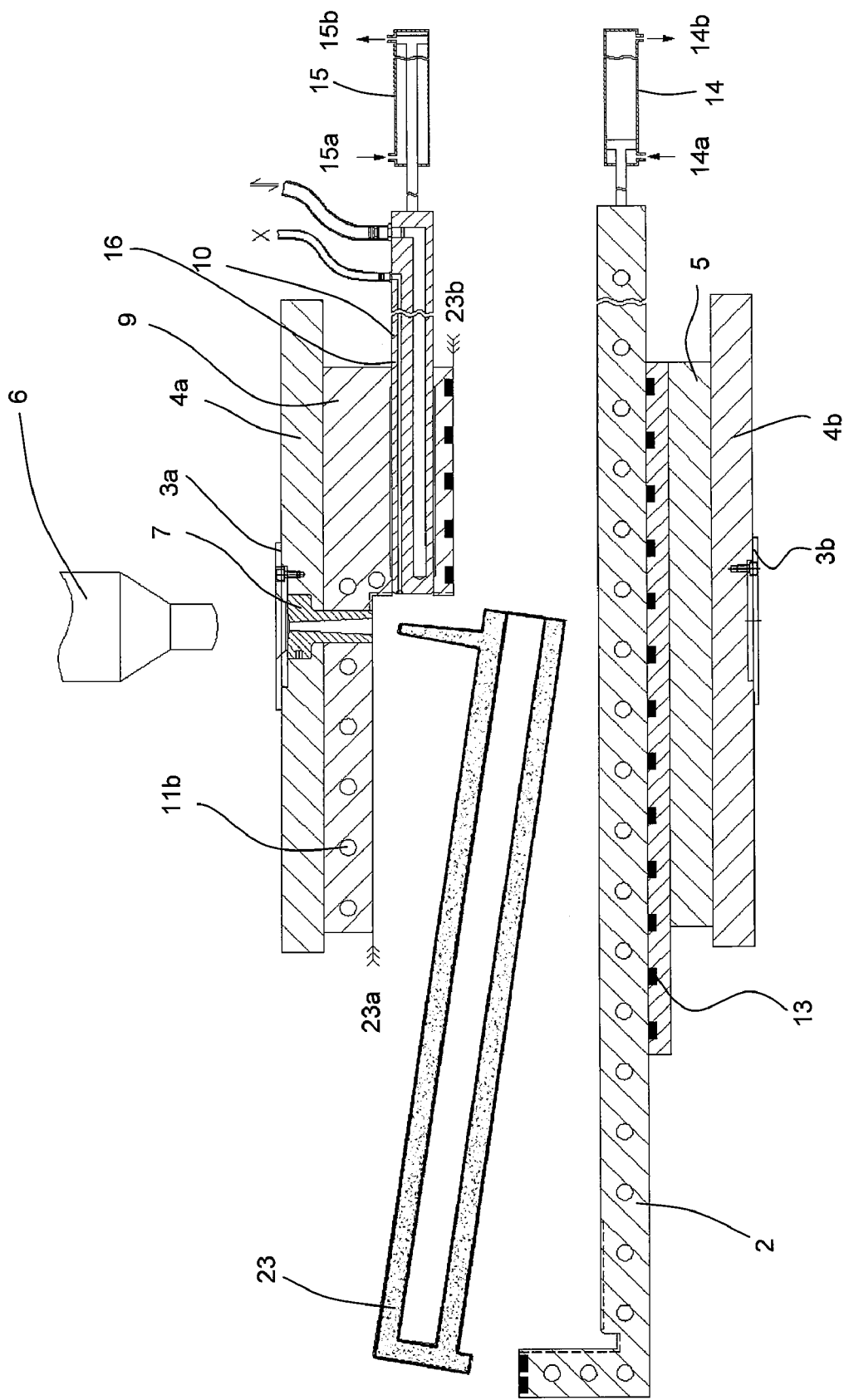

If the injection molding formed as described above reaches its default length, the movable mold insert 2 will also be stopped by closing the valves 14a, 14b. In analogy to a standard injection molding process, the molding cycle is continued and terminated by a holding-pressure phase and a cooling phase. After complete solidification of the sprue and metering of new molding compound, the injection unit 6 will be withdrawn. After the molded profiled component has completely solidified, the mold core 10 will be withdrawn until it is outside the component. Now the void can be filled with an additional reactive or solidifying agent. Then the mold will be opened as is shown in FIG. 6. The mold parting surfaces are illustrated by the reference numbers 23a, 23b. In order to eject the molded component from the mold, conventional, mechanical, pneumatic, hydraulic or electric ejector elements, which are not shown separately, are used. The injection molding can be taken out from the mold manually, by using an appropriate demolding device or by gravity just like at conventional injection molding processes. Finally the movable mold insert 2 is reset to its initial position by an appropriate actuation of the linear drive 14. Additionally the mold core 10 is reset to its initial position so that the mold can, once again, reach a condition that is in accordance with FIG. 1 and a new injection molding cycle can be initiated after the mold halves have been closed.

The method in accordance with the invention differs from conventional injection molding processes by providing a mold cavity 8, that is continuously expanded after the initial mold cavity 8 has been filled, the developing injection molding constantly growing at its sprue gate area and not at the flow front as this happens at conventional injection moldings. Additionally the solidifying molding compound injected earlier in the injecting phase is steadily transported away from the gate during the injection process. The shift of the movable mold insert 2 causes an increase in the volume of the mold cavity 8. This constantly provides space for areas to be newly built. Thus the injection molded component grows to its final length while the length of the flow path for the molding compound (melt) virtually stays constant.

In contrast to the extrusion process, the process based on the present invention has to be considered as a discontinuous process. For in any case, components of finite and defined length are formed. It is possible to adjust or change the length of the molded, profiled component in consecutive injection cycles without modifying or altering the mold. Thus it is possible to produce profiled parts of different lengths economically even in low numbers of pieces. At the extrusion process, for its part, high start-up must be considered until the process stabilizes. This causes the extrusion process to become uneconomical if there is only a low demand for running meters of the profile. If profiled components with different lengths are produced in a conventional injection molding process, significant proportional tooling costs are to be considered per piece, especially if the number of variants is high and/or the number of pieces is low. The invention avoids these disadvantages and additionally allows the formation of three-dimensional features, such as end domes at the injection molding.

At the embodiment of the invention illustrated in FIG. 7 to 10, no movable mold core is provided but only a movable mold insert 24. In analogy to the embodiment of the invention described above, one part of the mold comprises a mounting plate 4a, a centering ring 3a, a stationary mold insert 9' and a sprue bush 7. The second part of the mold substantially comprises a mounting plate 4b, a centering ring 3b and guide rails 12 for the mold insert 24, which is movable to the stationary mold insert 9 in accordance with the earlier embodiment of the invention. In analogy to the first embodiment of the invention, sliding elements are incorporated. These elements are not described any further. The movable mold insert 24 is designed in such a way that the profiled component shown in FIG. 7a can be manufactured. The component 24 is an elongated component with a U-shaped cross section and end caps 24'a, 24'b at the frontal sides. The threaded bolts 24f, are directly integrated during the molding process in order to enable subsequent fastening of additional elements.

Figure 7:
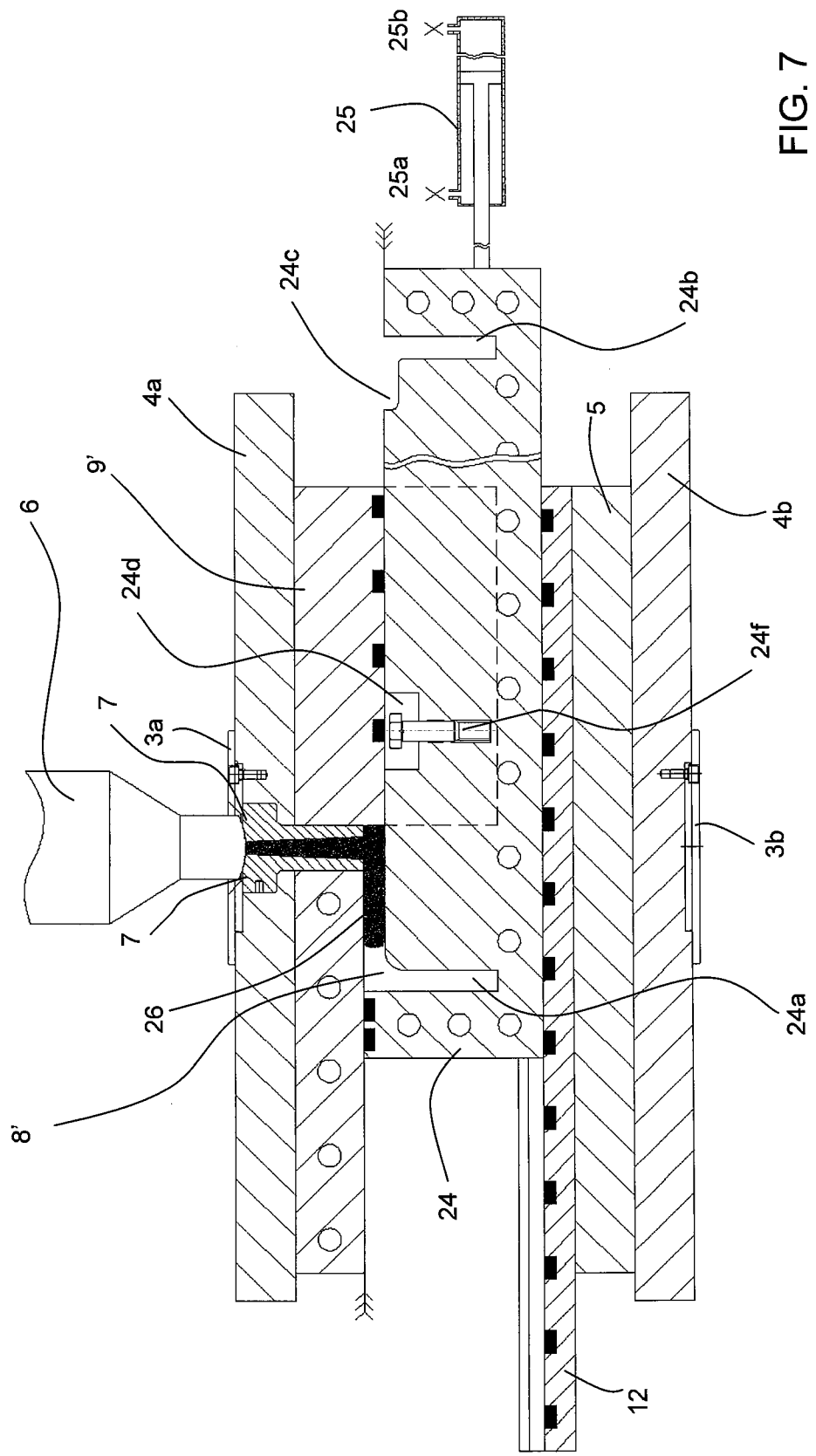
Figure 7A:
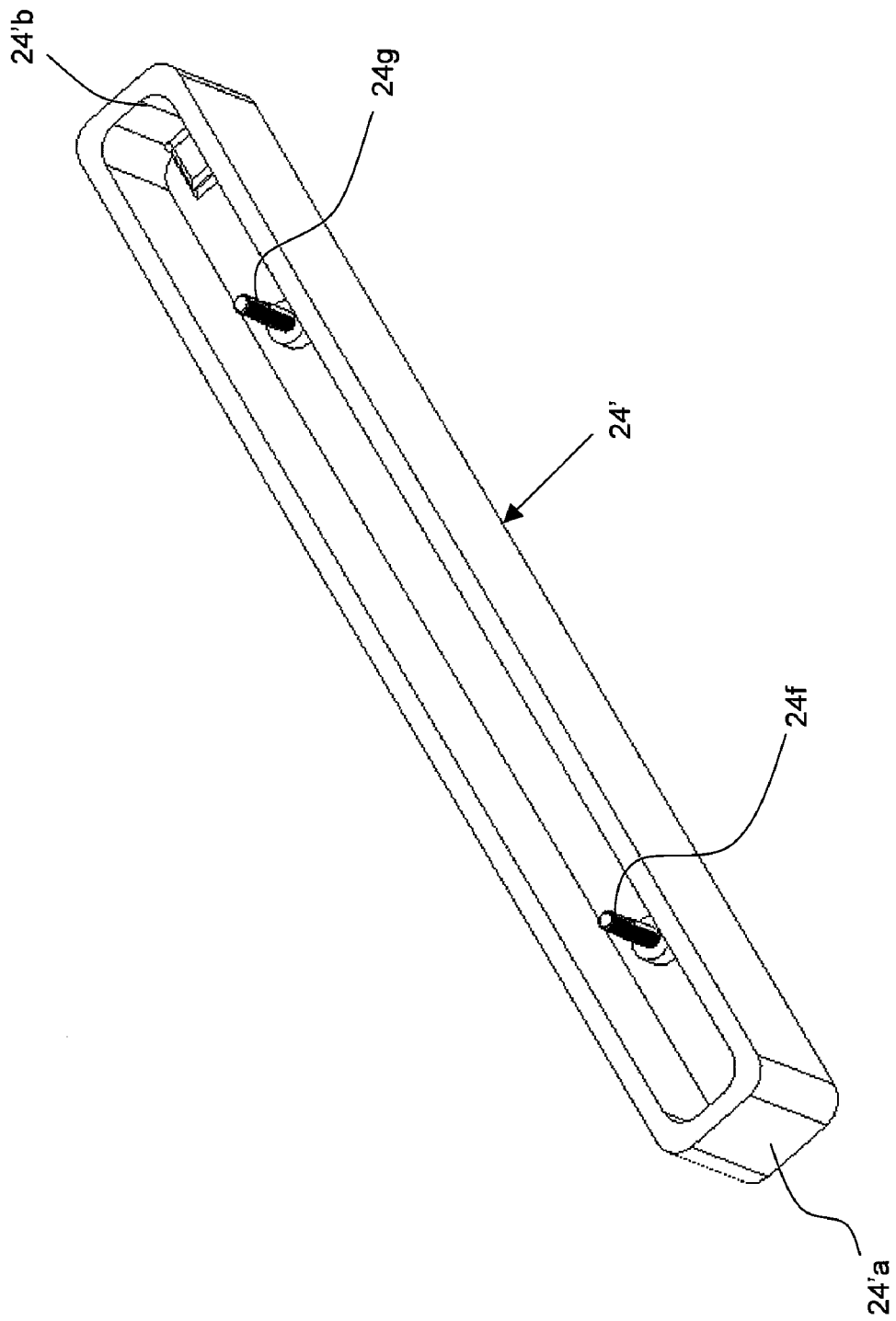
Figure 8:
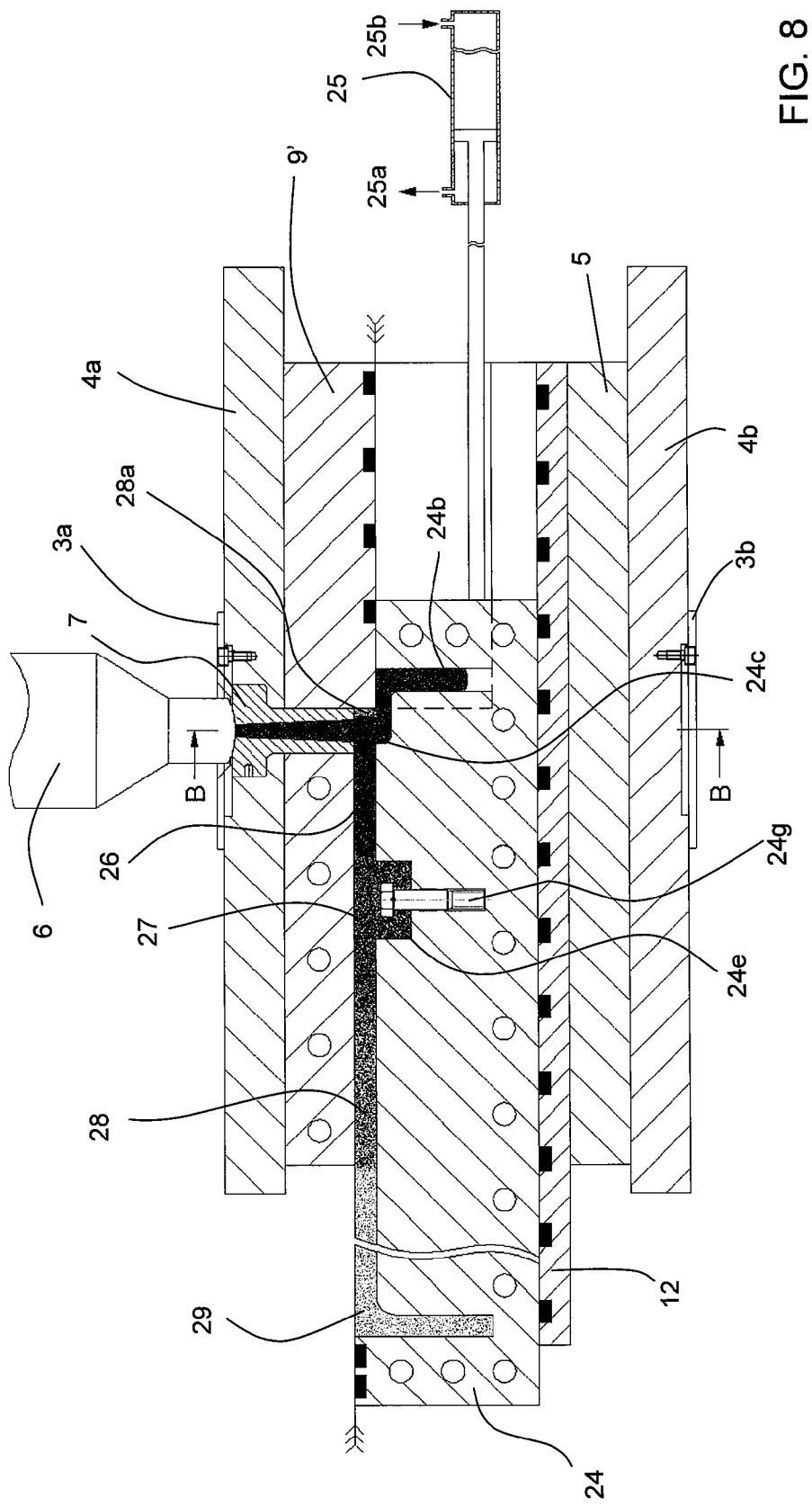
Figure 9:
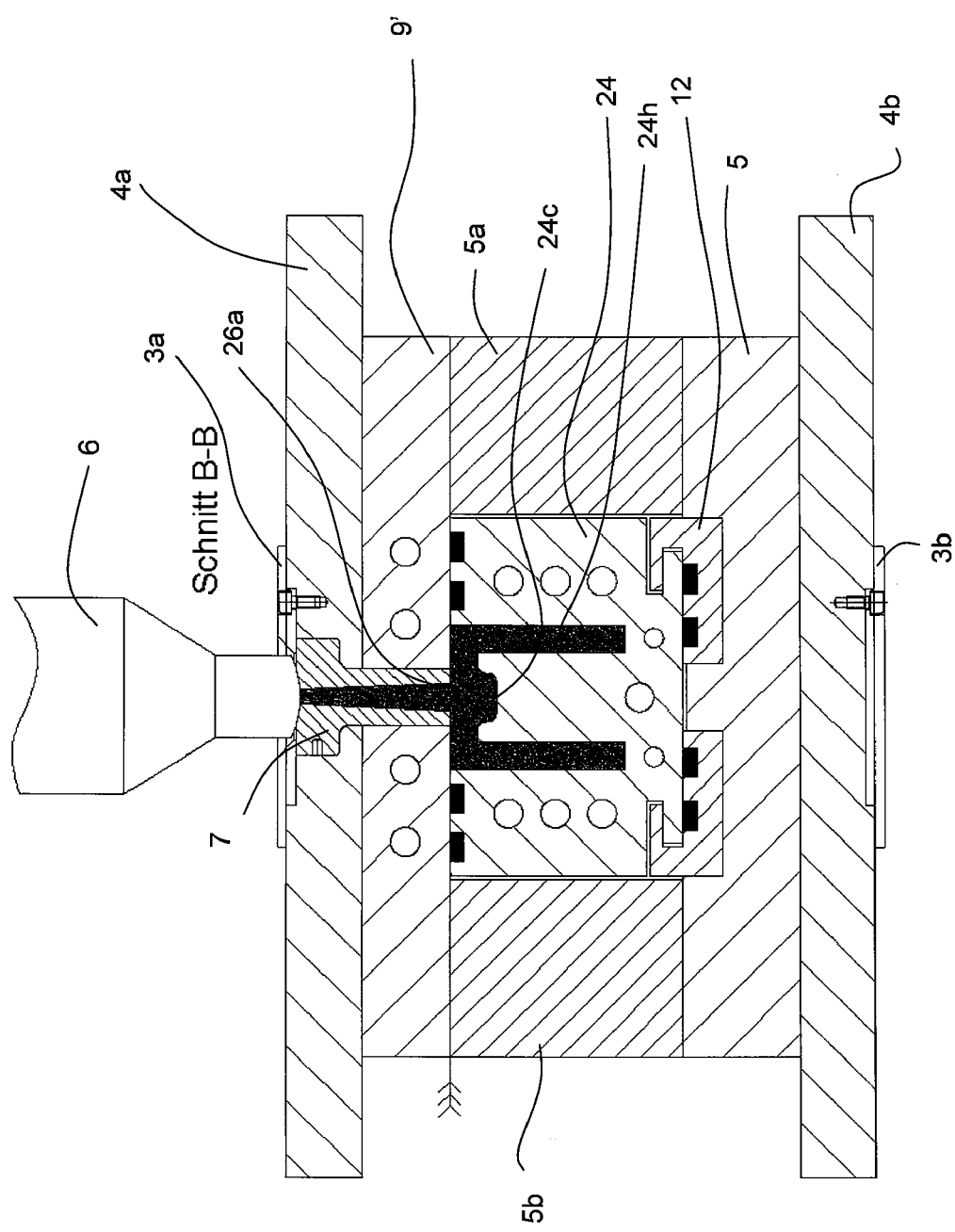

As is shown in FIG. 7 to 10, the movable mold insert 24 is implemented in such a way that there are two depressions 24a, 24b for the formation of the end caps 24'a, 24'b and two grooves which are parallel to each other and aligned longitudinally with the mold insert 24, in which the lateral walls of the injection molded component are formed. The two threaded bolts 24f, 24g are inlay components which are pre-positioned in appropriate recesses 24d (see FIG. 7) of the mold insert 24. 24f is shown in FIG. 7, 24g is shown in FIG. 7 and FIG. 8. The initial mold cavity is formed by the mold insert 9', 24'.

In analogy to the embodiment of the invention illustrated in FIG. 1 to FIG. 6, the movable mold insert 24 will, during the filling of the mold cavity 8', be filled with plasticated molding compound 26 through a sprue bush 7 in corresponding interaction with pressure, temperature and time and moved by a linear drive 25 implemented in analogy to the linear drive 14. The reference numbers 25a and 25b typify the valves for the control of the linear drive 25. The movement of the mold insert 24 is controlled by the linear drive 25 and the respective process parameters of the injection molding machine.

As illustrated in FIG. 8, the injection molding compound increasingly solidifies as filling is progressing. This is schematically illustrated by the differently shaded areas 27, 28, 29. The area of the injection molding formed first 29 is already dimensionally stable. At the end of the injection process, an overflow area 24c at the movable mold insert 24 makes it possible to fill up the depression 24b in order to form the second end cap 24'b despite the molding compound 28a, which is already solidified, at the flow shadow next to the gate. The overflow area 24c is a depression at the inner side of the mold insert 24 as is especially shown in FIG. 9. There the molding compound is plasticated throughout the cross section 26a.

Figure 10:
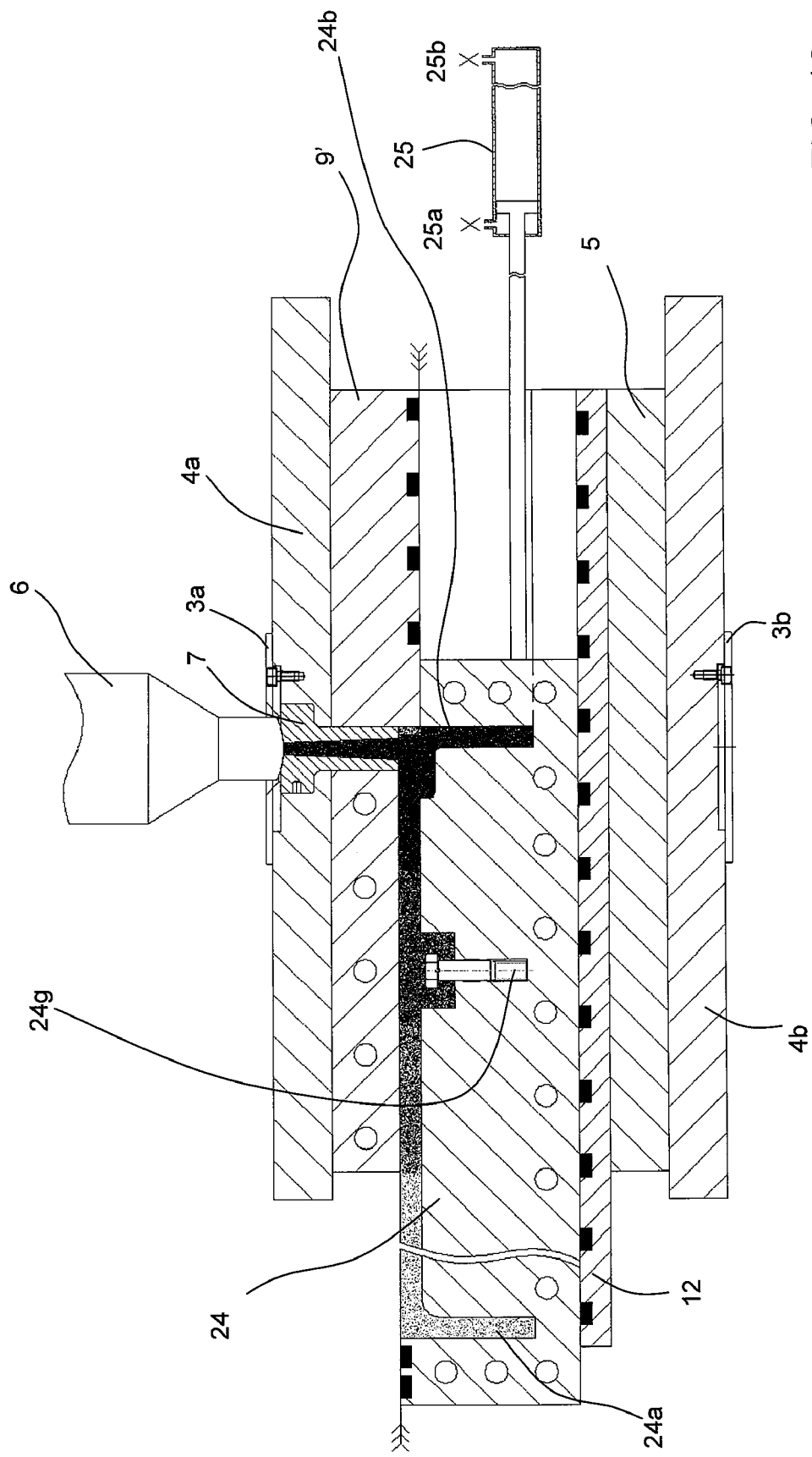

FIG. 10 shows the final stage of the filling process. The linear drive 25 is in its end position, the valves 25a, 25b are closed. After solidification of the component, the form can be opened, and the molded component 24' can be ejected. The reset of the mold insert 24 is only possible after the opening of the mold. With the embodiment illustrated in FIG. 7 to FIG. 10, it is easily possible to use differently shaped movable mold inserts in order to manufacture longer components or components with different profiles. Even a modular design of movable mold inserts, for example with changeable mold inserts, is possible.

In addition, it should be mentioned that the known special injection molding processes can be combined with the process and the molds in accordance with the present invention. For example, the molding compound can be used in the conventional injection molding process and/or in a special process, such as injection compression molding, multi-component injection molding, foil decorating, in-mold decorating, gas assistant molding, textile fabric decoration, over-molding, reaction injection molding and other special processes.

An additional embodiment of the mold in accordance with the invention is illustrated in FIG. 11 to FIG. 14. In analogy to the embodiment shown in FIG. 1 to FIG. 6, one of the two parts of the mold comprises a lower mounting plate 4b, a lower centering ring 3b, a mold plate 5 and support rails 5a and 5b (see FIG. 13). A movable mold insert 33 which is supported by guide rails that provide appropriate sliding elements in a way that it can be moved in longitudinal direction of the injection mold. The second part of the mold comprises the upper mounting plate 4a, the upper centering ring 3a and a stationary mold insert 9". In analogy to the embodiment of the invention shown in FIG. 1 to FIG. 6, there is a mold core 32, which is supported in a movable manner by the stationary mold insert 9". The initial mold cavity 8" is formed between the mold core 32 and the movable mold insert 33, which provides a cross section that is about U-shaped and is similar to the first design (refer to FIG. 11 and FIG. 13). Instead of a single sprue bush, there are two hot runner nozzles 30, 30a, which feed plasticated molding compound over corresponding injection units 6, 6a. In analogy to the core 10, the mold core 32 is provided with a cooling channel 11c, a venting channel 16 and a valve 16a at the frontal end as well as appropriate feeding lines. The core 32 and the movable mold insert 33 can be moved by linear drives 14, 15 in analogy to the embodiment illustrated in FIG. 1 to 6. On the mold core 32, a hollow profile 24 with a rectangular cross section is positioned as an inlay component. This inlay could, for example, be a metal profile for increasing the stiffness of the developing injection molding.

Figure 11:
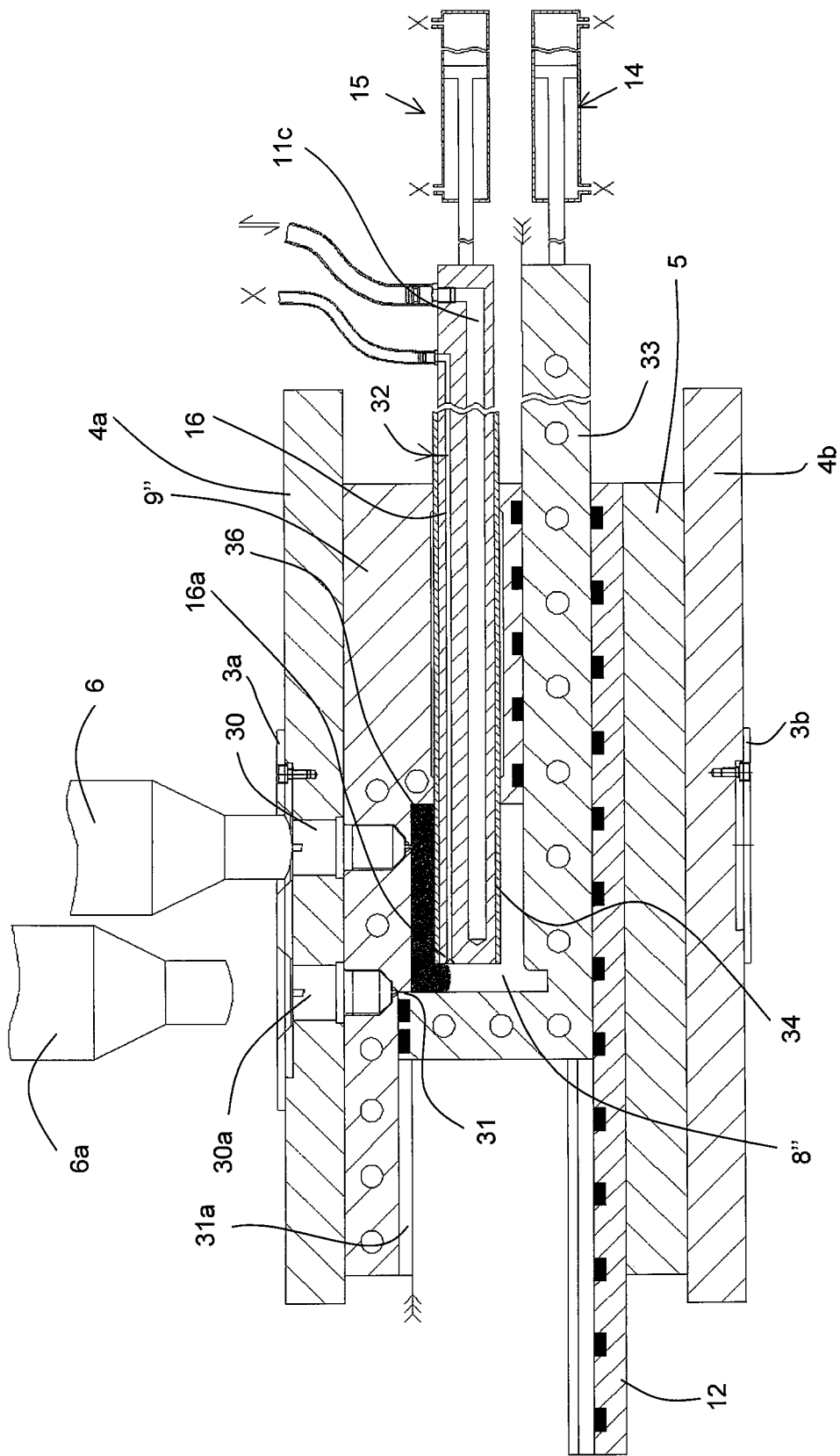
Figure 12:
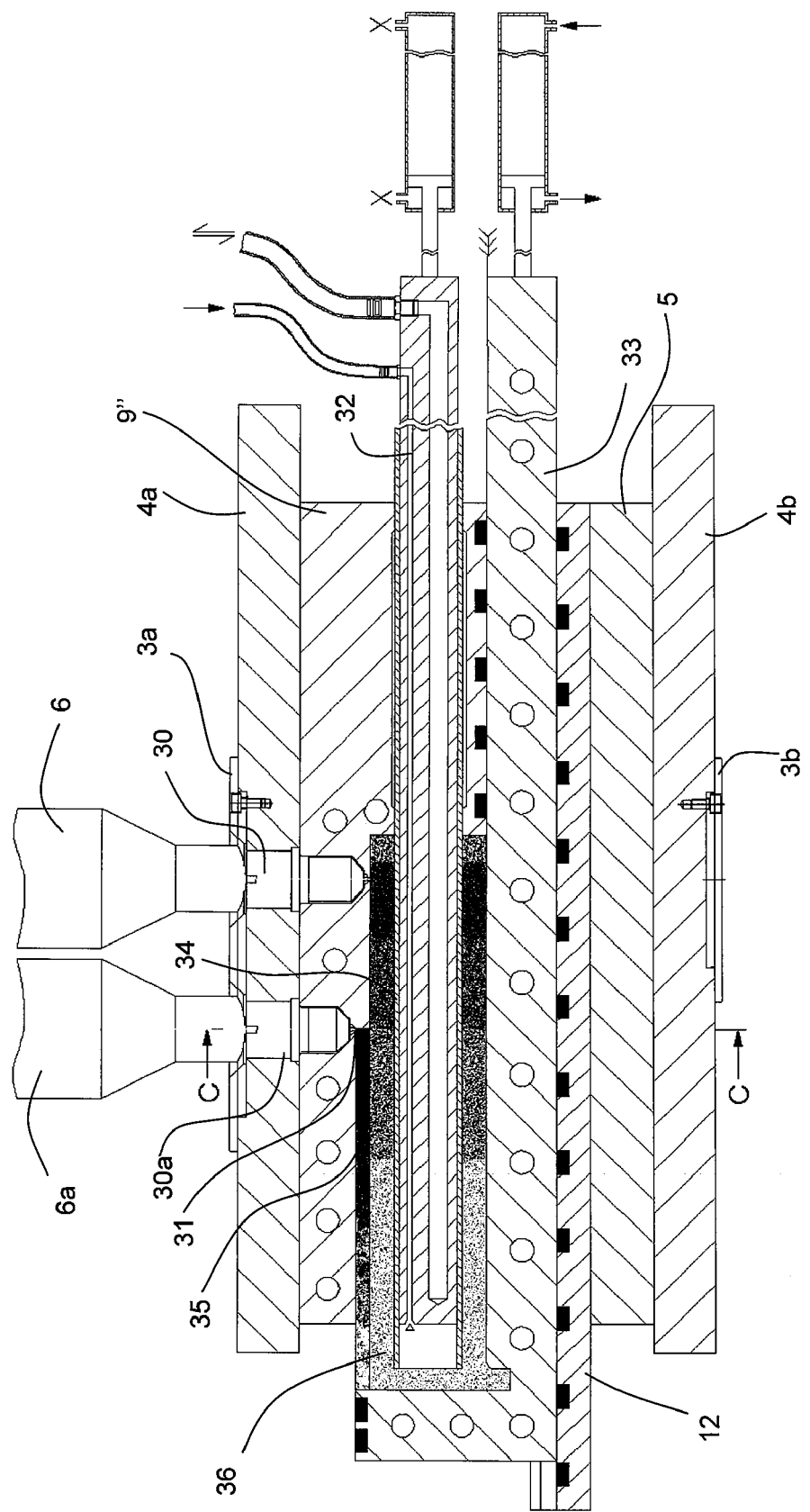
FIG. 12 is the injection mold in accordance with FIG. 11 in a later stage during the injection process.
Figure 13:
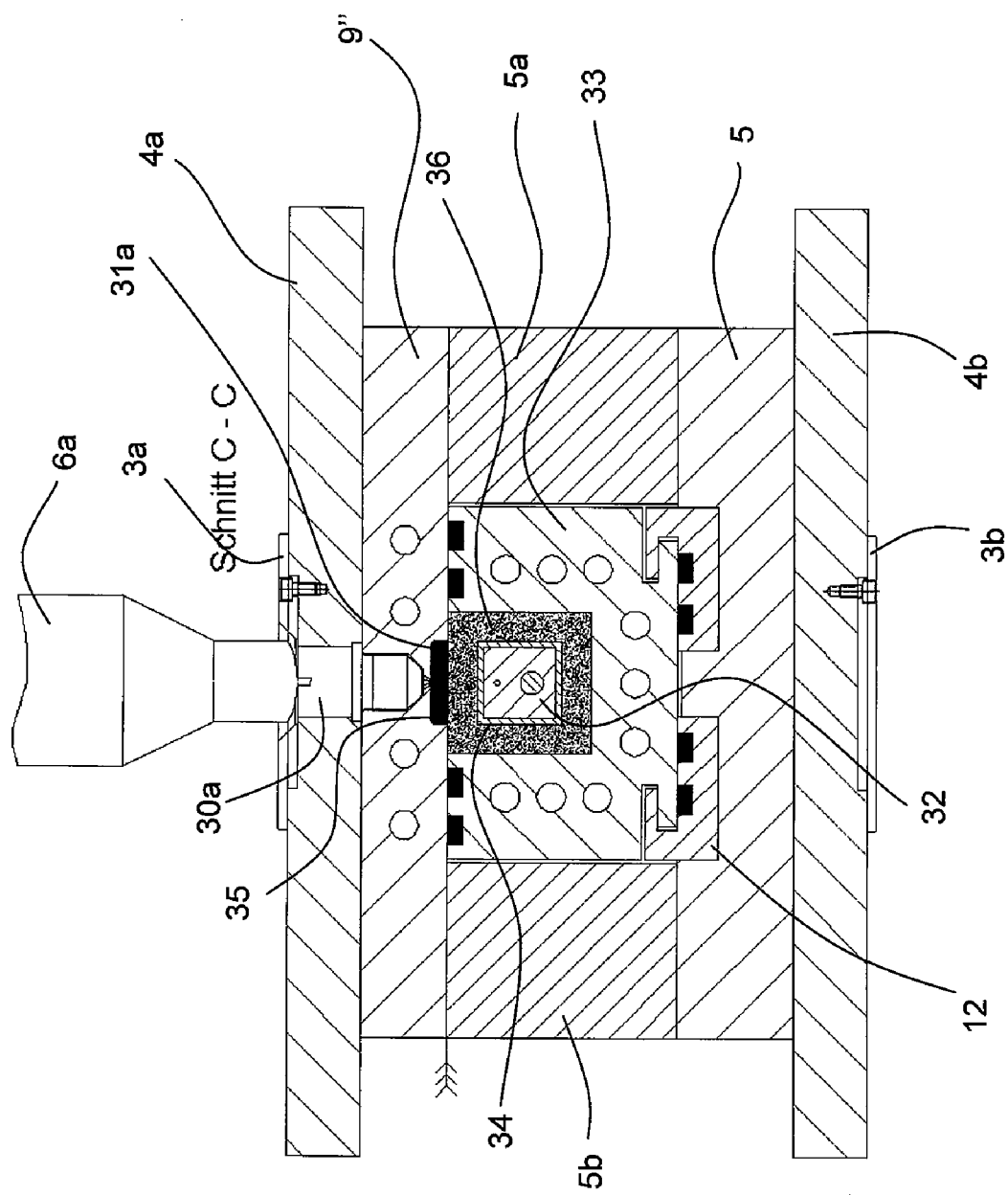
FIG. 13 is a cross sectional view taken about on line C-C of FIG. 12.
Figure 14:
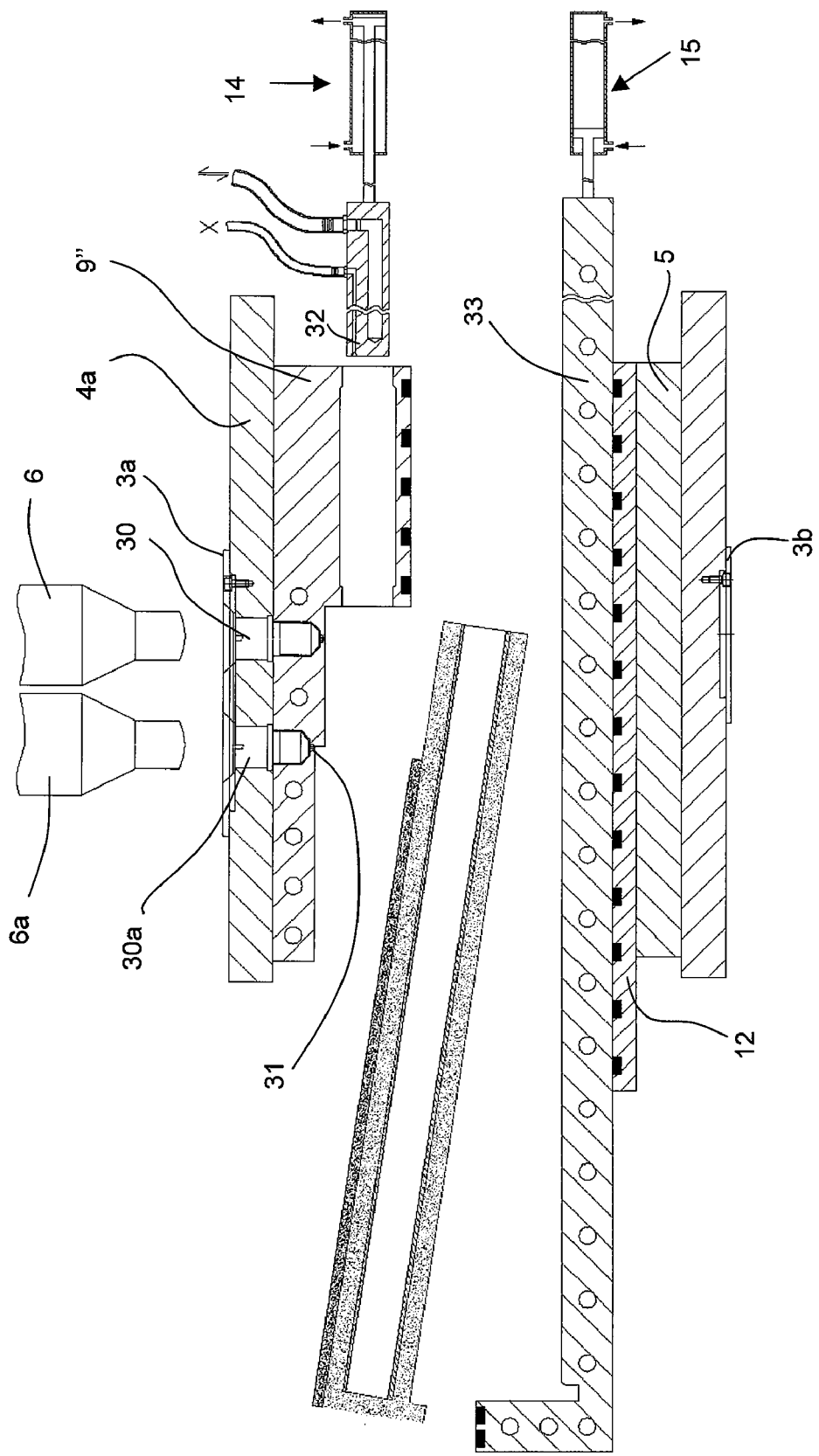
FIG. 14 is a longitudinal cross sectional view of the opened injection mold in accordance with FIG. 11 and FIG. 12 directly after termination of the injection and forming process, respectively.

FIG. 11 shows the position of the mold components at the beginning of the injection process while the first plasticated molding compound 36 is being injected through the hot runner nozzle 30. Directly after volumetric filling of the cavity 8", a synchronous longitudinal movement of the mold core and the movable mold insert 32 is triggered. After release of the step 31 in the mold insert 9", which forms the boundary of a longitudinal recess 31a, the second hot runner nozzle 30a is released, and the injection of the second plasticated molding compound 35 is enabled as is especially shown in the cross section in FIG. 13. The second molding compound 35 is thus directly over-molded on the first component 36. The subsequent process steps are virtually analogous to the process steps illustrated from FIG. 3 to FIG. 6, above all the demolding and ejection of the molded 2-component-part shown in FIG. 14.

The illustrated and described embodiments can be varied a lot. For example, a solid profile or a hollow profile closed at the front can be applied as inlay component if the rigidity of the inlay part can bear the applied injection pressure. In this case, no core would be necessary, and the end of the inlay part can be linked to the linear drive 15 by an adapter so that the inlay part itself is moved synchronously with the profiled injection molding. Coupling the inlay part with the movable mold insert (either by friction or by a positive-locking connection) or a connection of the inlay part with the injection molding by an undercut at the front end of the injection molding are further possibilities to move the inlay part during the injection process. In this case, no linear drive for the inlay part is necessary any more.

For all embodiments, of the present invention primarily a thermoplastic material which is intended for injection into the mold depending on time related influence of pressure and temperature in a molten state and which solidifies in the mold due to freezing of the molten material is used. Nevertheless, the molding compound can also be a reactive liquid, e.g. a thermoset or an elastomer, which can be injected into the mold in analogy to a thermoplastic material but which solidifies due to chemical reaction. Another possibility is to apply ceramic or metallic molding compounds.

The method in accordance with the invention is particularly suitable for the production of components out of thermoplastic molding compounds which are reinforced with long fibers, especially long glass fibers. In comparison to traditional injection molding, the method based on the invention excels by short flow distances and a low number of applicable gates per mold cavity. This results in a low mechanical stress acting on the molding compound so that the long fibers are kept in a good state.

The process pressure at injection can correspond to injection pressures at the conventional injection molding processes and thus be approximately in the range between 10 bar and 2500 bar, these levels being pre-set at the injection molding machine. Typical cavity pressures are between 50 bar and 1400 bar. When molding thermoplastic compounds, the temperatures virtually lie between +130° C. and +400° C. Reactive molding compounds (thermosets, elastomers) can be processed even at lower temperatures down to room temperature. When molding metal molding compounds temperatures of up to 650° C. are possible.

In analogy to known conventional injection molding processes, the method based on the invention and the device based on the present invention offer the possibility to use all types of decorative or functional, metallic, ceramic or similar inlay parts, such as threaded bushes, polymeric décor films\foils or films, textile fabrics, wooden veneers, metal or rubber films. Nevertheless the variants of possible inlay parts described above is for the purpose of illustration not for limitation. It is referred to would like to hint at the state of the art concerning the special processes in injection molding technology.

There will be an additional degree of freedom for formation orthogonally to the main sense of motion if guide rails which are movable in a direction normal to the primary moving direction of the movable mold insert and which are driven by additional linear drives are used instead of the guide rails 12. Based on the geometric boundaries of the mold frame, it is thus possible to mold profiled components along a non-linear extrusion path. This enables the production of steadily bent profiles or profiled components with angular transition zones, for example picture frames or components with a sheet like geometry.

Another possibility to form curved profiles results from the use of curved, movable mold inserts. In this case, the movable mold insert can, for example, be shifted along a circular path relative to the stationary mold components by a linear drive with the described type. The circular path lies within a plane which is defined by the main direction of the component and opening direction of the two parts of the mold. The path plane can be in parallel as well as normal to the mold parting surface parting the mold. In contrast to a mold insert that is movable in two directions, the geometries that can be generated here are restricted to a circular base geometry.

Possible applications for the method in accordance with the invention can be found wherever plastic materials and other compounds that are plastically formable are turned into components and products with elongated geometries. In this case, "elongated" means that the length of these components is large as compared to its cross section area, which is defined by its width and height. The method particularly enables the production of all kinds of profiles which, in contrast to profiles from extrusion process, already have their finite length after being manufactured, and provide a geometry deviating from the profile cross section in defined areas of the component, especially at the end. Besides the possible applications mentioned above, the method also is suitable for the production of sports and leisure equipment, (such as skiing components, umbrella poles, components for tents, components for boots and sliding rails), office supplies, (such as rulers, backs of filing folders or clamping rails), elements for windows and doors, (such as profiles with integrated connection elements), functional elements, (such as corner joints, guide rails, décor rails or lattices), furniture components, (such as decorative blinds, guide rails, decorative rails, handle rails, functional frames or picture frames, products for construction and interior decoration, (such as lamp covers, elements for fences, handrails for stairs and balconies, socket ledges, picture frames, door blinds, tube segments containing media, components for escalators and elevators as well as supporting elements), toys, (such as functional rails or rackets), functional and decorative elements for vehicles, (such as decorative ledges, A-pillar blinds and entry ledges), tools, (such as handles and parts of ladders, means of transport and packaging goods, (such as supporting bars, pallet components, protective bars), machine components and means of transport, (such as sliding rails, gear rails, handle bars, decorative blinds, light blinds, functional sealing strips, shafts, guide rails, protective bars, load carrying rails or decorative rails).

We claim:

1. Method for the production of profiled, at least partially elongated components out of liquid or viscous and solidifying molding compounds by an injection mold,
   the molding compound being injected into the mold cavity and, after the mold cavity has been initially filled, the mold cavity being extended by a movable mold insert which defines a portion of the mold cavity, and the molding compound being steadily transported away under said extension of the mold cavity and under steady elongation of the component to be formed;
   the molding compound being injected until the component to be formed has reached its final length;
   wherein said movable mold insert has a predetermined inner shape which defines a corresponding shape of an outer peripheral surface of the component which extends over the entire length of the component; and
   the movable mold insert comes out of the injection mold together with the component formed by the solidified molding compound.

2. Method according to claim 1, characterized in that the movable mold insert is moved in a linear manner in one defined direction.

3. Method according to claim 1, characterized in that the movable mold insert is moved along a curved path or a path with angular sections.

4. Method according to claim 1, characterized in that a void is formed in the molded component by means of a movable mold core.

5. Method according to claim 4, characterized in that the initial mold cavity is partially formed by the mold core.

6. Method according to claim 5, characterized in that a movement of the mold core is influenced by the pressure of the injected molding compound after volumetric filling of the initial mold cavity.

7. Method according to claim 5, characterized in that the mold core is moved synchronously to and in accordance with the movement of the movable mold insert, at least partially.

8. Method according to claim 5, characterized in that the mold core is driven and controlled by a linear drive.

9. Method according to claim 4, characterized in that sections of the injection molding already solidified are transported out of the mold together with and by the movable mold insert while they are being detached from at least one of a stationary mold insert and the mold core.

10. Method according to claim 9, characterized in that the movable mold insert is stopped after the component to be formed has reached its final length.

11. Method according to claim 9, characterized in that the mold core is reset to its initial position after complete solidification of the component.

12. Method according to claim 11, characterized in that the void formed by the core is filled with a substance, after the mold core has moved back.

13. Method according to claim 10, characterized in that the movable mold insert is reset to its initial position after the component has been ejected.

14. Method according to claim 8, characterized in that the linear drive is directly controlled or feedback controlled by pre-defined process parameters.

15. Method for the production of profiled, at least partially elongated components out of liquid or viscous and solidifying molding compounds by an injection mold,
   the molding compound being injected into the mold cavity and, after the mold cavity has been initially filled, being steadily transported away under extension of the mold cavity and under steady elongation of the component to be formed;

the molding compound being injected until the component to be formed has reached its final length, at which time the molding compound is transported away by a movable mold insert, which forms an outer peripheral surface of the component;

characterized in that the movable mold insert comes out of the injection mold together with the solidified molding compound, and characterized in that there are at least two gates through which different molding compounds can be fed, the initial cavity being filled up by means of one of the gates and the opening(s) to the further gates are being gradually released by the movable mold insert during the expansion of the mold cavity.

16. Method according to claim 9, characterized in that the initial mold cavity is flushed with a medium or evacuated by use of a bore provided in the mold core.

17. The method according to claim 1, characterized in that the movement of the movable mold insert is influenced by the pressure of the injected molding compound after volumetric filling of the initial mold cavity.

18. The method according to claim 17, characterized in that the movable mold insert is driven and controlled by a linear drive.

19. Method according to claim 12, wherein said substance is a foam.

20. Method according to claim 15, characterized in that a void is formed in the molded component by means of a movable mold core.

21. Method according to claim 20, characterized in that sections of the injection molding already solidified are transported out of the mold together with and by the movable mold insert while they are being detached from at least one of a stationary mold insert and the mold core.

22. Method according to claim 15, wherein after the mold cavity has been initially filled, the mold cavity being extended by a movable mold insert which defines a portion of the mold cavity, and the molding compound being steadily transported away under said extension of the mold cavity and under steady elongation of the component to be formed.

23. Method according to claim 22, wherein said movable mold insert has a predetermined inner shape which defines a corresponding shape of an outer peripheral surface of the component which extends over the entire length of the component; and the movable mold insert comes out of the injection mold together with the component formed by the solidified molding compound.

* * * * *